United States Patent
Watanabe et al.

(10) Patent No.: US 12,125,220 B2
(45) Date of Patent: Oct. 22, 2024

(54) SURFACE CHARACTERISTICS EVALUATION METHOD, SURFACE CHARACTERISTICS EVALUATION APPARATUS, AND SURFACE CHARACTERISTICS EVALUATION PROGRAM

(71) Applicants: Shuhei Watanabe, Chiba (JP); Takayuki Gotoh, Kanagawa (JP); Takuroh Sone, Kanagawa (JP)

(72) Inventors: Shuhei Watanabe, Chiba (JP); Takayuki Gotoh, Kanagawa (JP); Takuroh Sone, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 404 days.

(21) Appl. No.: 17/624,853

(22) PCT Filed: Jul. 29, 2020

(86) PCT No.: PCT/JP2020/029165
§ 371 (c)(1),
(2) Date: Jan. 5, 2022

(87) PCT Pub. No.: WO2021/020482
PCT Pub. Date: Feb. 4, 2021

(65) Prior Publication Data
US 2022/0262019 A1    Aug. 18, 2022

(30) Foreign Application Priority Data
Jul. 30, 2019  (JP) ................................. 2019-140260

(51) Int. Cl.
*G06T 7/40* (2017.01)
*G01J 3/46* (2006.01)
(Continued)

(52) U.S. Cl.
CPC ................ *G06T 7/40* (2013.01); *G01J 3/504* (2013.01); *G01N 21/55* (2013.01); *G06T 7/0004* (2013.01);
(Continued)

(58) Field of Classification Search
CPC .......... G06T 7/40; G06T 7/0004; G06T 7/90; G06T 2207/10024; G06T 2207/10152;
(Continued)

(56) References Cited

U.S. PATENT DOCUMENTS 9,417,132 B2 *  8/2016  Xin ........................ G01J 3/0208
10,332,306 B2 *  6/2019  Kohlbrenner .......... G01N 21/57
(Continued)

FOREIGN PATENT DOCUMENTS

JP  2009-074981  4/2009
JP  5475057  4/2014
(Continued)

OTHER PUBLICATIONS

Office Action issued Apr. 4, 2023 in Japanese Patent Application No. 2019-140260, 3 pages.
(Continued)

*Primary Examiner* — Matthew C Bella
*Assistant Examiner* — Andrew B. Jones
(74) *Attorney, Agent, or Firm* — XSENSUS LLP

(57) ABSTRACT

A surface characteristics evaluation method for evaluating a surface characteristic of a painted surface including a glittering material, including: a multi-angle condition image acquisition step S101 for acquiring a multi-angle condition image including multi-angle conditions in a continuous manner by performing an image-capturing process to capture how a reflection condition of the painted surface changes when rotating an illumination device 2 emitting light onto the painted surface, the image-capturing process
(Continued)

being performed by the line scan camera 4 while a sample P having the painted surface is moved in a certain direction; an in-plane chromaticity distribution acquisition step S102 for acquiring an in-plane chromaticity distribution of the painted surface from the multi-angle condition image acquired; and a surface characteristics evaluation step S107 for calculating particle characteristics S as surface characteristics evaluation values of the multi-angle conditions, on the basis of the in-plane chromaticity distribution acquired.

20 Claims, 14 Drawing Sheets

(51) Int. Cl.
  *G01J 3/50*     (2006.01)
  *G01N 21/55*    (2014.01)
  *G06T 7/00*     (2017.01)
  *G06T 7/90*     (2017.01)
  *H04N 23/56*    (2023.01)
  *H04N 23/74*    (2023.01)

(52) U.S. Cl.
  CPC ............... *G06T 7/90* (2017.01); *H04N 23/56* (2023.01); *H04N 23/74* (2023.01); *G01J 2003/467* (2013.01); *G01N 2021/557* (2013.01); *G06T 2207/10024* (2013.01); *G06T 2207/10152* (2013.01); *G06T 2207/30108* (2013.01)

(58) Field of Classification Search
  CPC . G06T 2207/30108; G06T 2207/10016; G01J 3/504; G01J 2003/467; G01N 21/55; G01N 2021/557; G01N 21/27; G01N 2021/4714; G01N 2021/4723; G01N 2021/8841; G01N 21/01; G01N 21/84; H04N 23/56; H04N 23/74
  See application file for complete search history.

(56) References Cited

U.S. PATENT DOCUMENTS

| | | |
|---|---|---|
| 2002/0060789 A1 | 5/2002 | Fukazawa et al. |
| 2004/0174518 A1* | 9/2004 | Naiki ................. G01N 21/8806 356/237.2 |
| 2006/0187455 A1 | 8/2006 | Ito et al. |
| 2015/0131090 A1 | 5/2015 | Osumi |
| 2016/0360184 A1 | 12/2016 | Tausch et al. |
| 2017/0010158 A1* | 1/2017 | Osumi ...................... G01J 3/46 |
| 2018/0259394 A1 | 9/2018 | Gotoh et al. |
| 2018/0350059 A1 | 12/2018 | Watanabe et al. |
| 2020/0018650 A1 | 1/2020 | Sone et al. |

FOREIGN PATENT DOCUMENTS

| | | | |
|---|---|---|---|
| JP | 2018-009987 | | 1/2018 |
| JP | 2018-009988 | | 1/2018 |
| JP | 2018009988 A | * | 1/2018 |
| JP | 2018-151165 A | | 9/2018 |

OTHER PUBLICATIONS

Office Action issued Oct. 27, 2023 in Chinese Patent Application No. 202080051178.2, 12 pages.
International Search Report Issued on Nov. 26, 2020 in PCT/JP2020/029165 filed on Jul. 29, 2020, 15 pages.

* cited by examiner

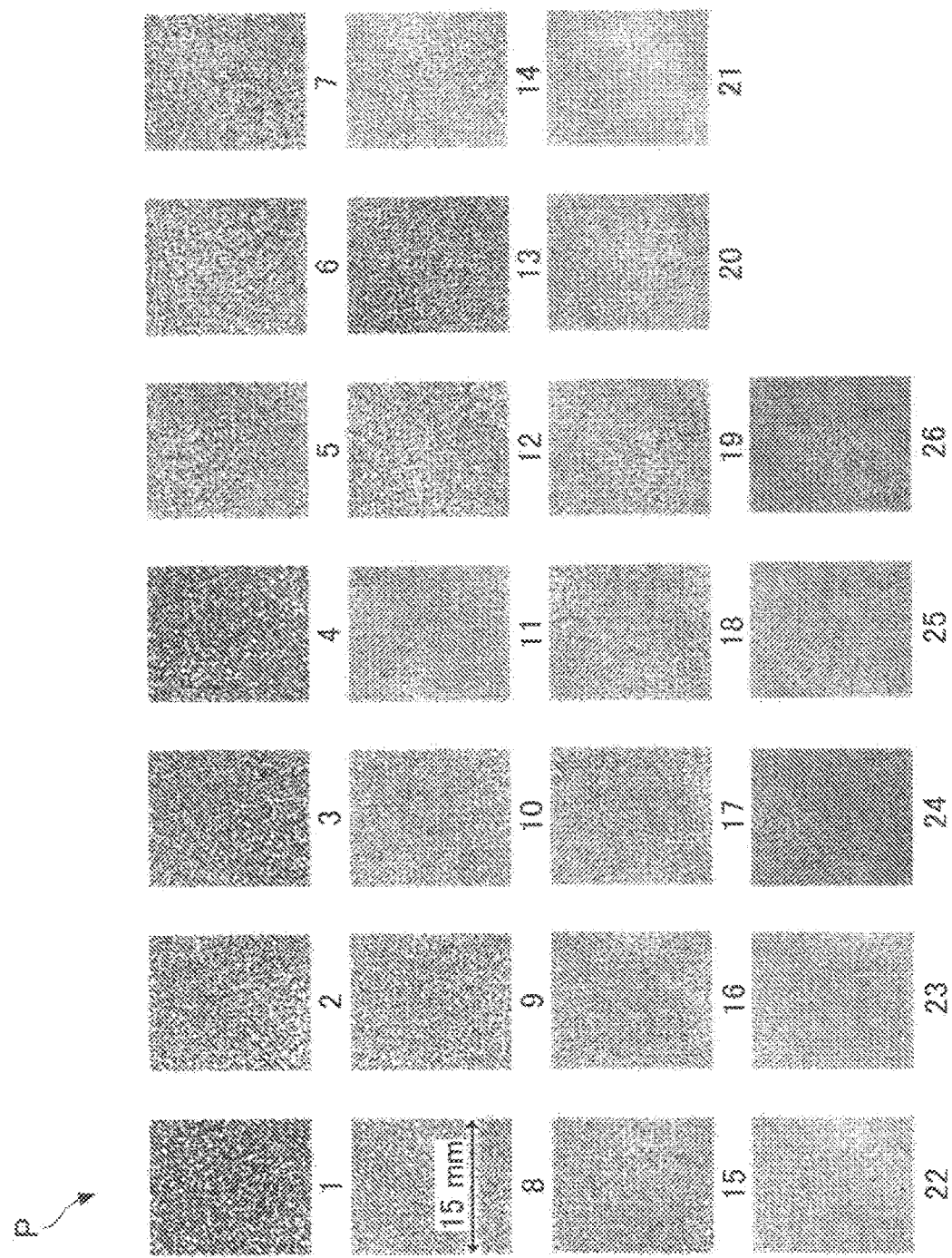
[Fig. 1]

[Fig. 2]
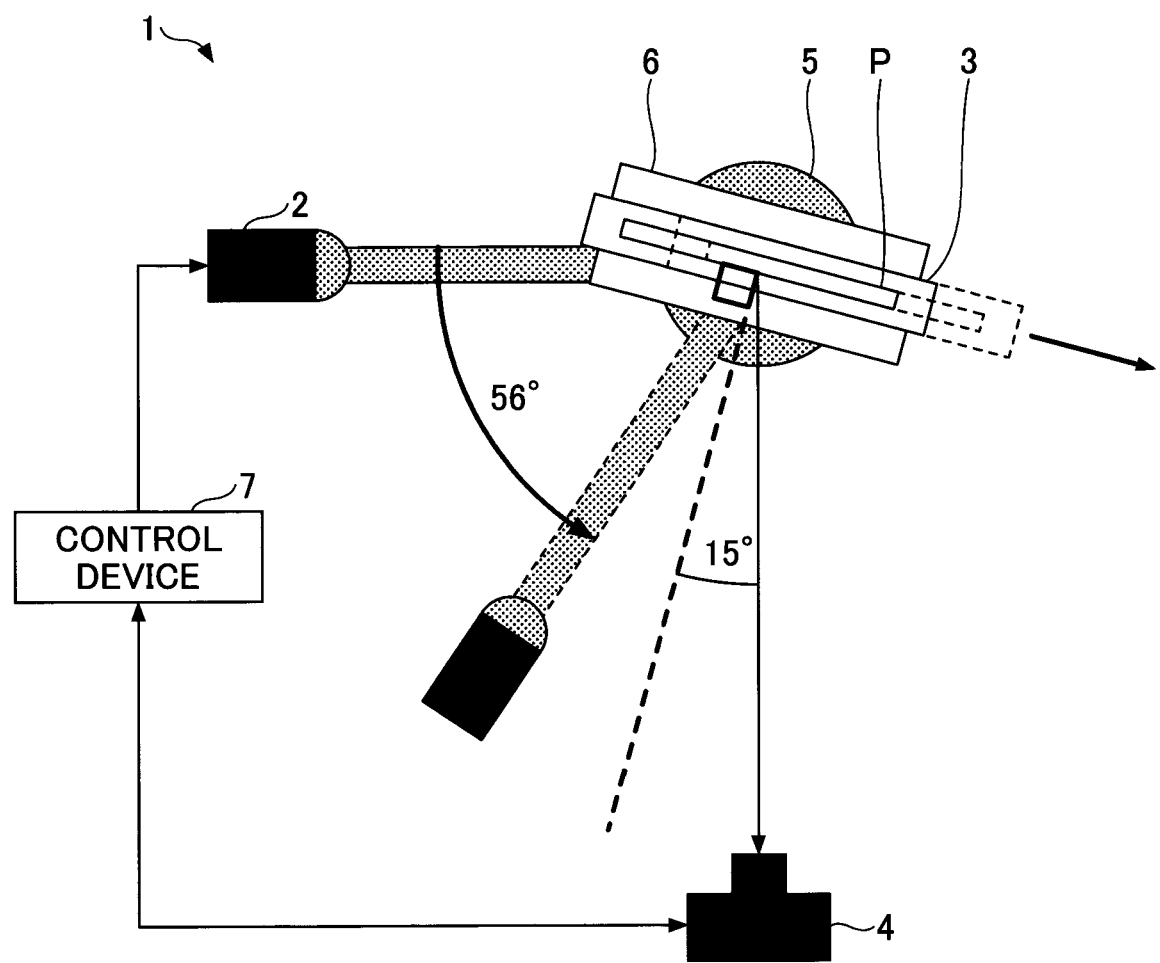

[Fig. 3]
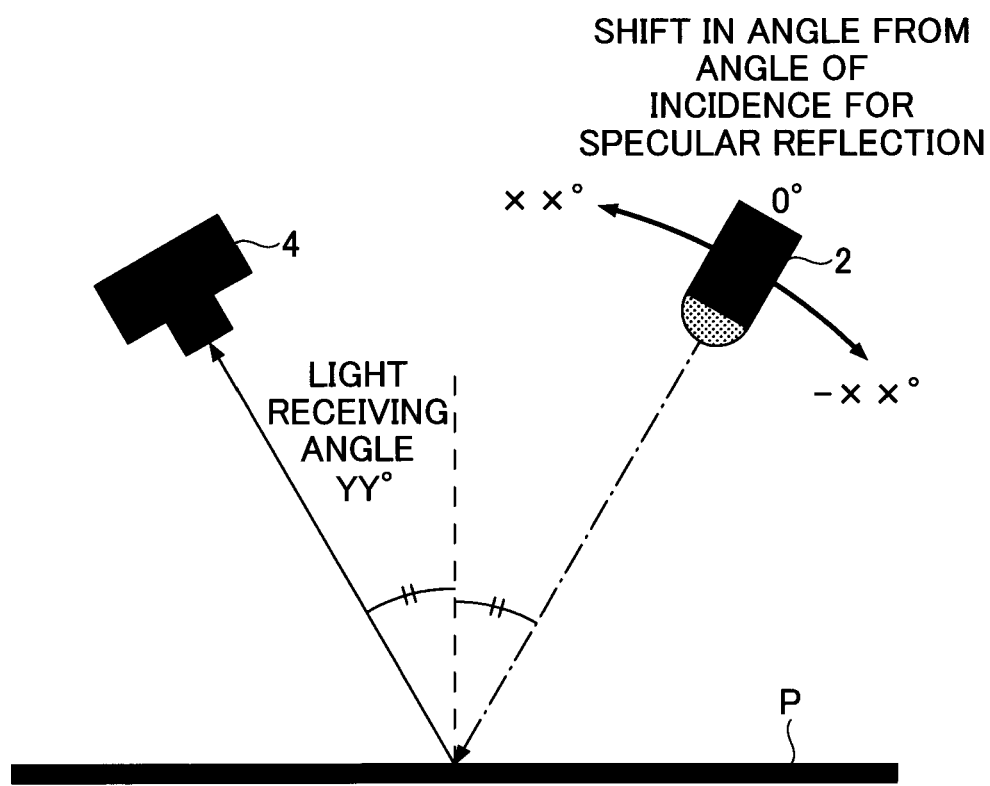

[Fig. 4A]
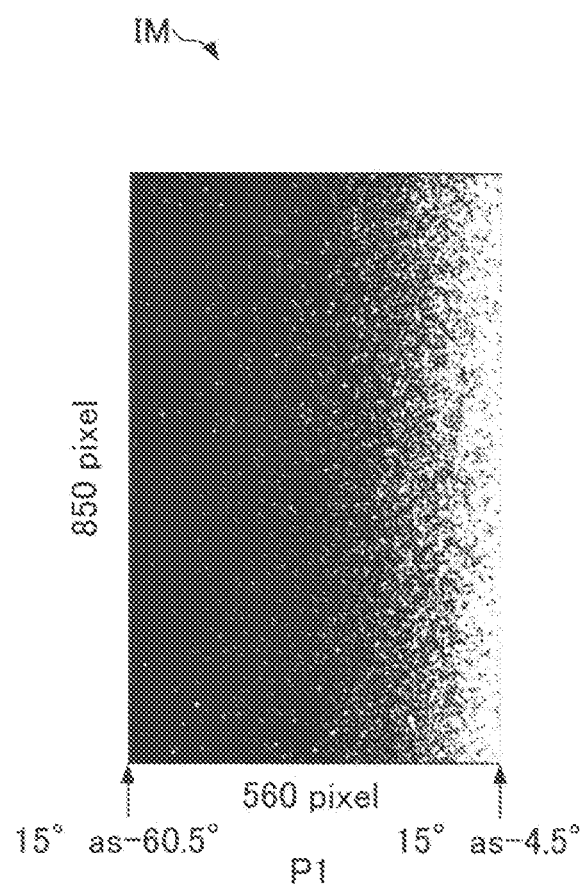

[Fig. 4B]
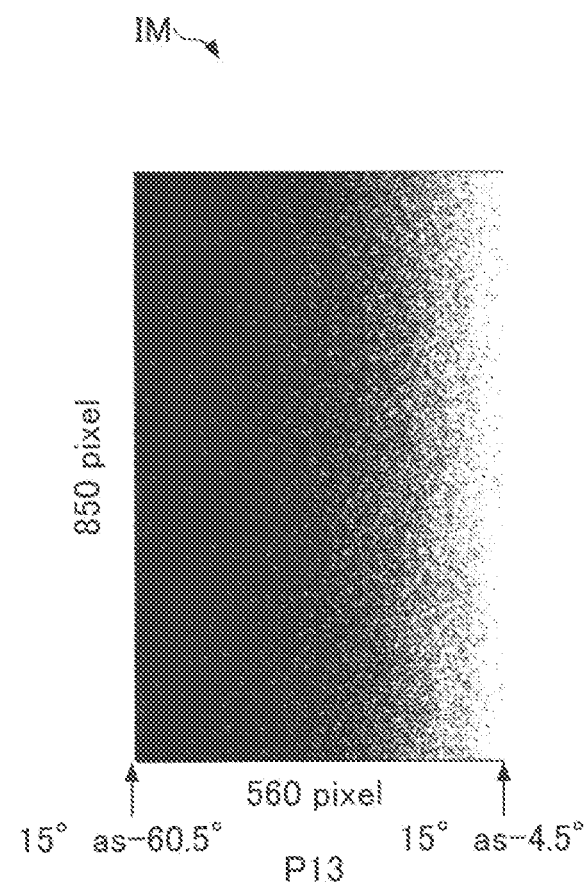

[Fig. 4C]
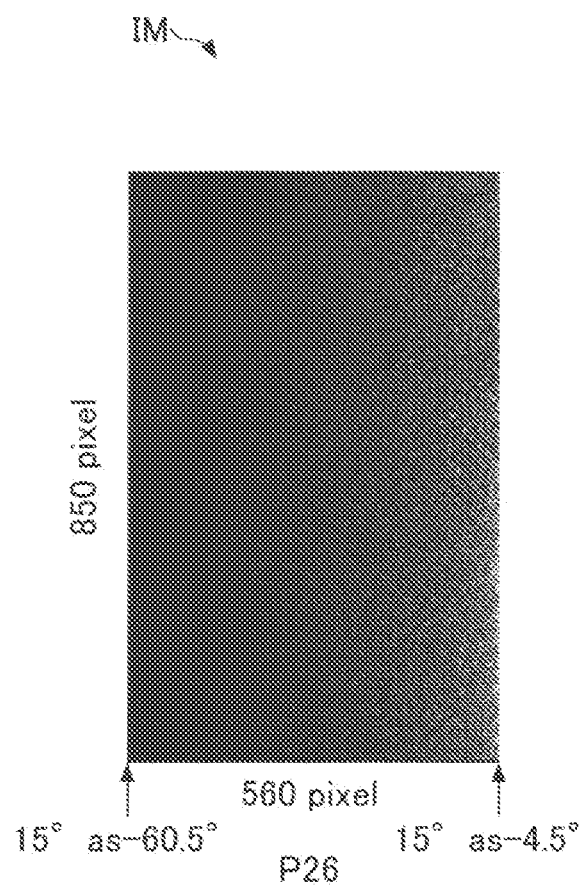

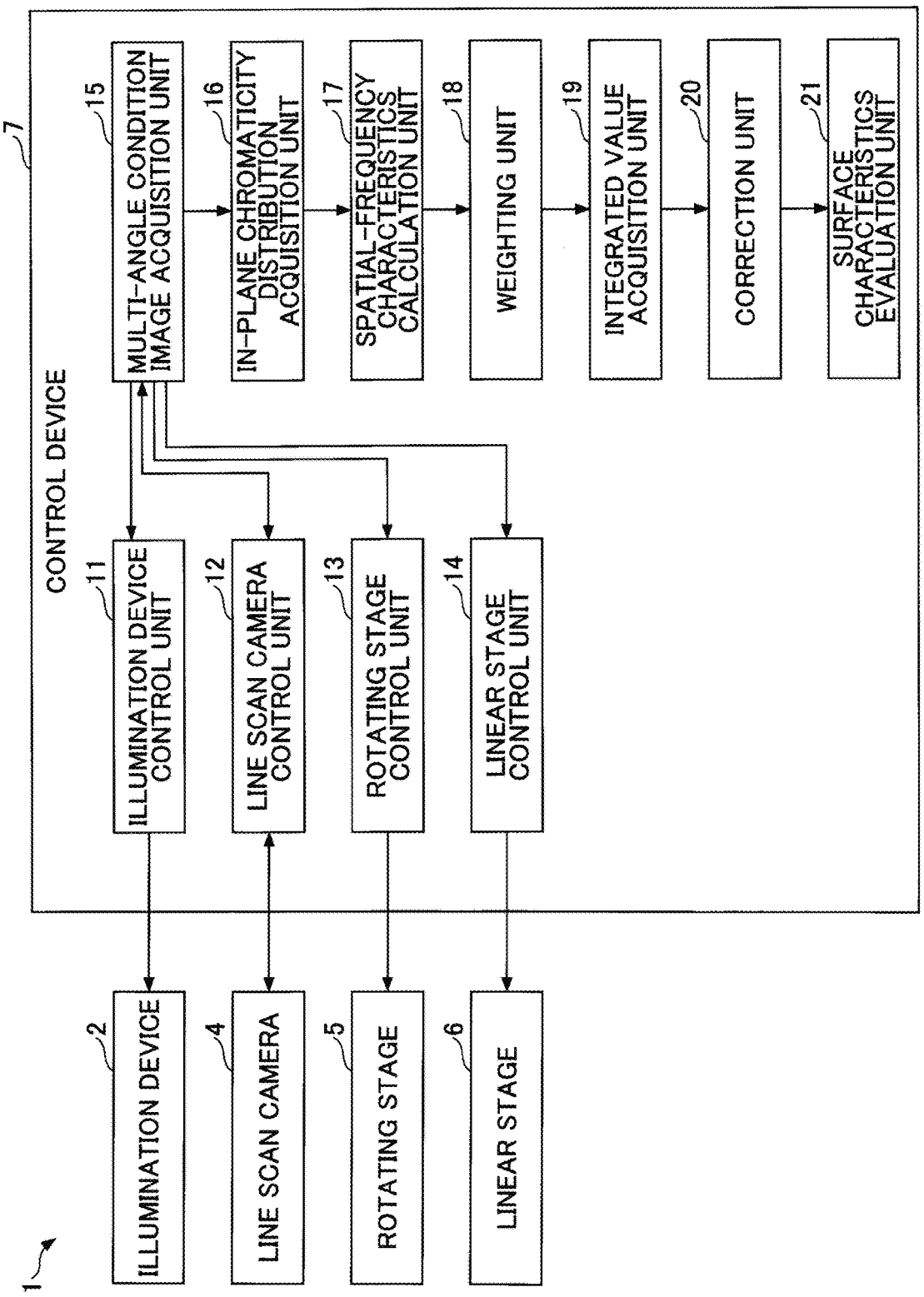
[Fig. 5]

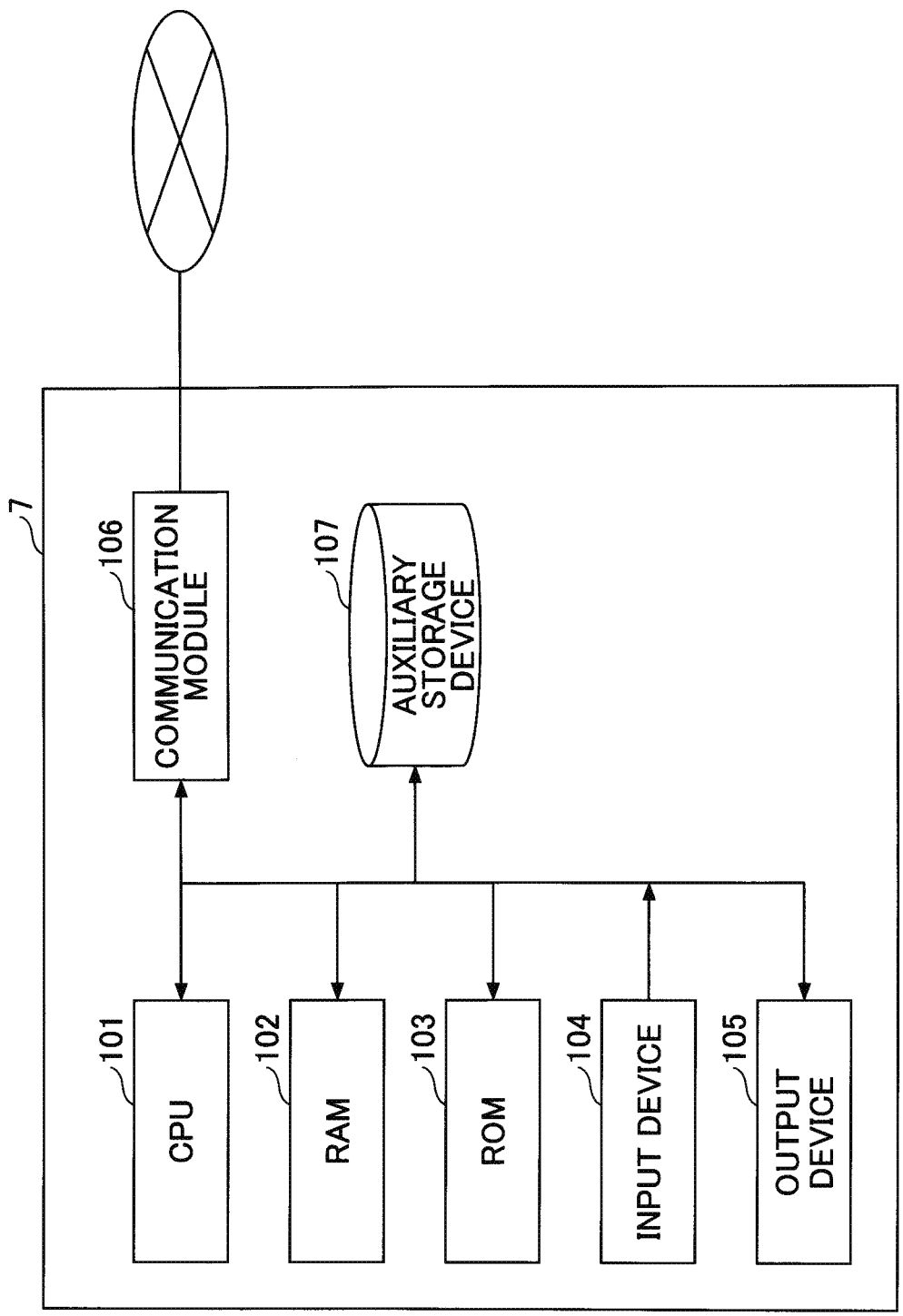
[Fig. 6]

[Fig. 7]
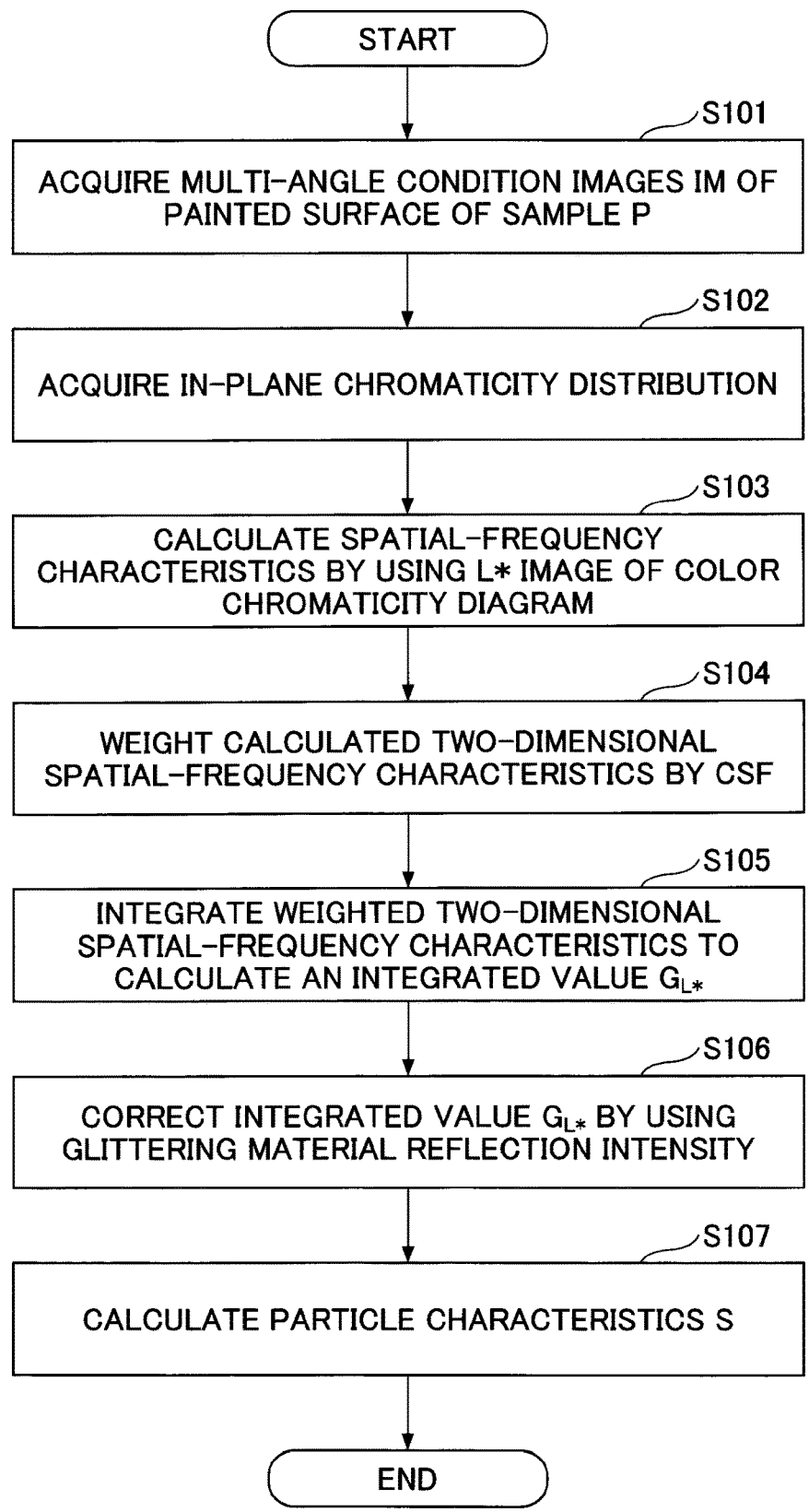

[Fig. 8]
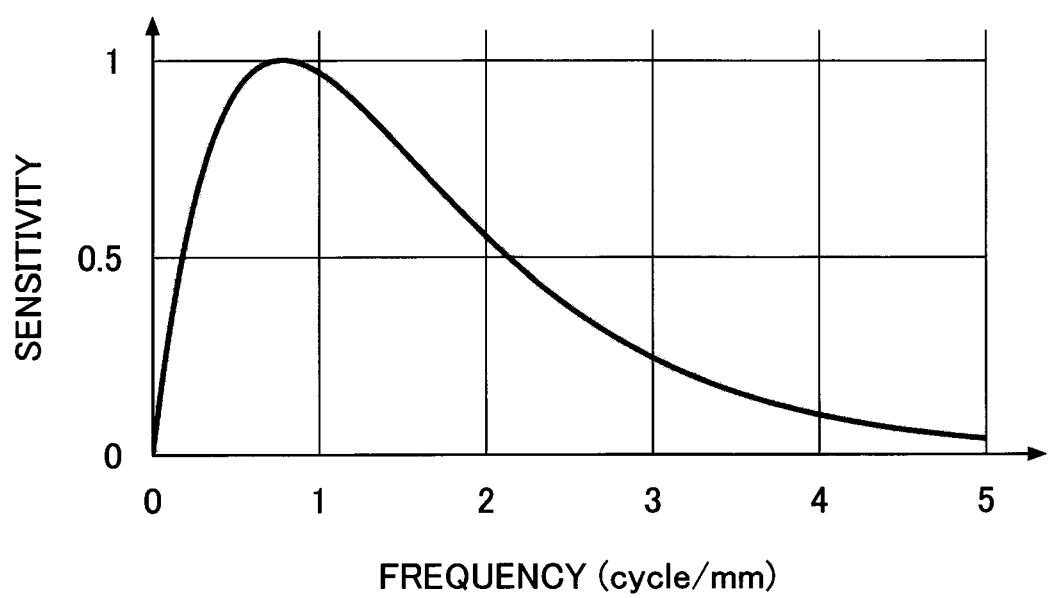

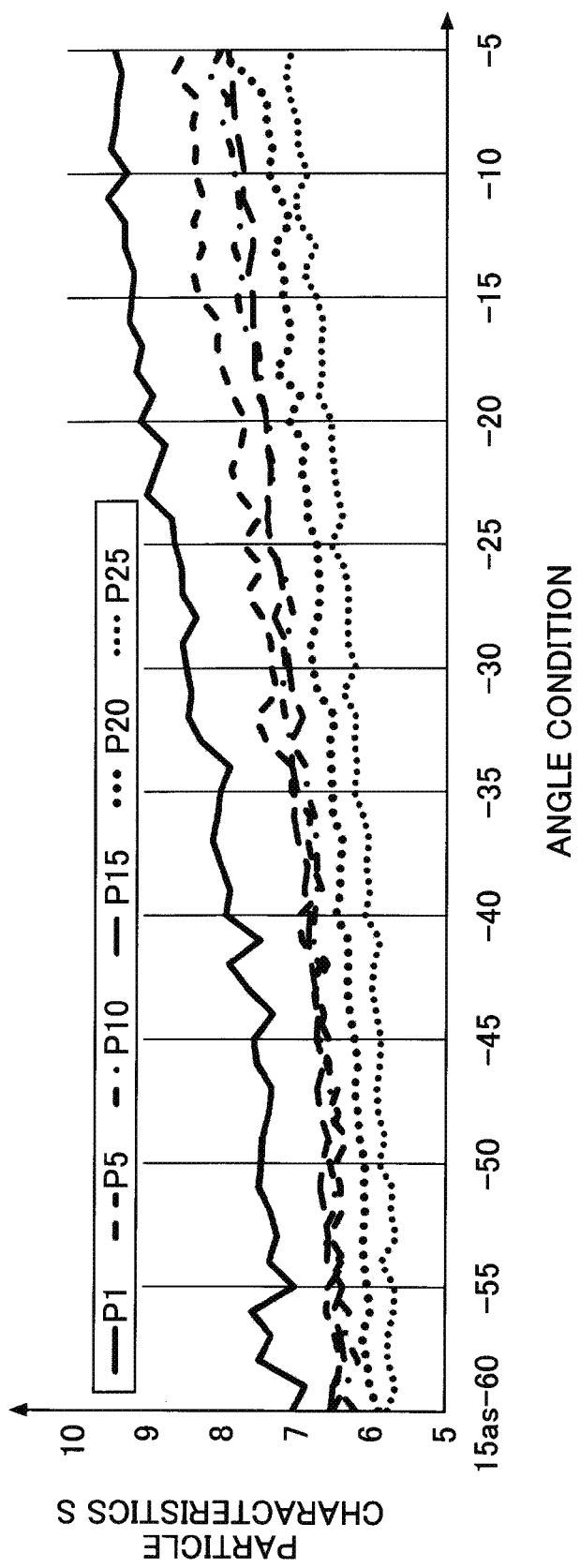
[Fig. 9]

[Fig. 10A]
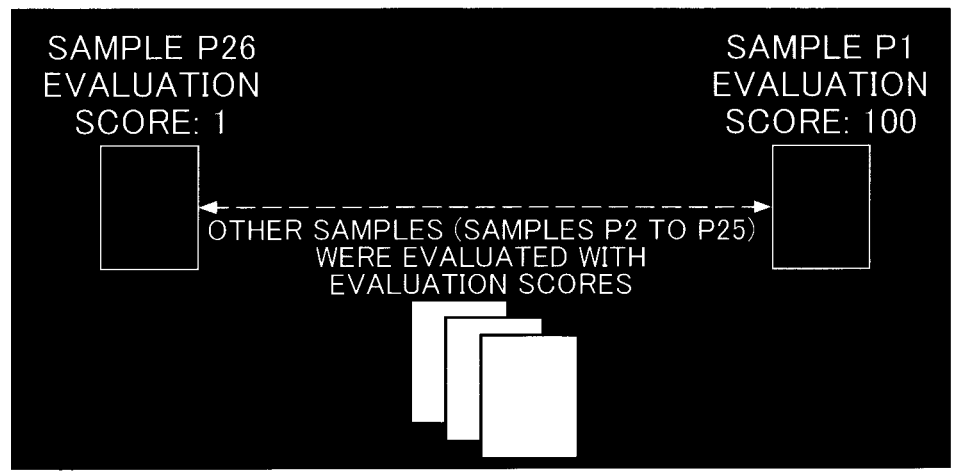
PROCEDURE OF EXPERIMENT
[Fig. 10B]
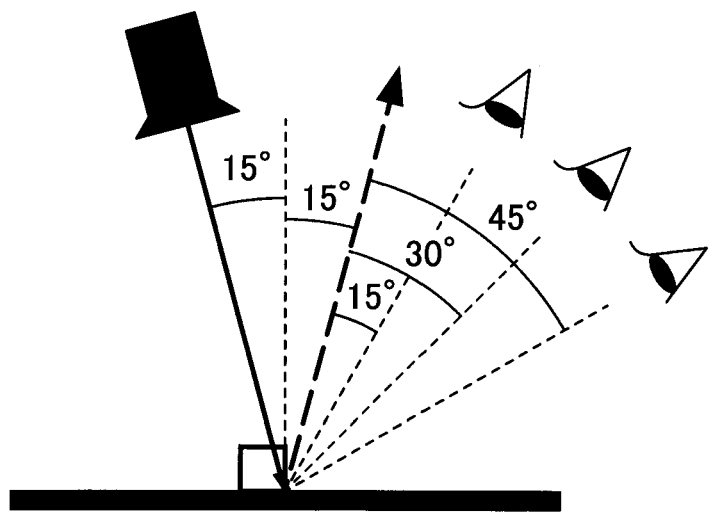
CONDITION OF EXPERIMENT

[Fig. 11A]
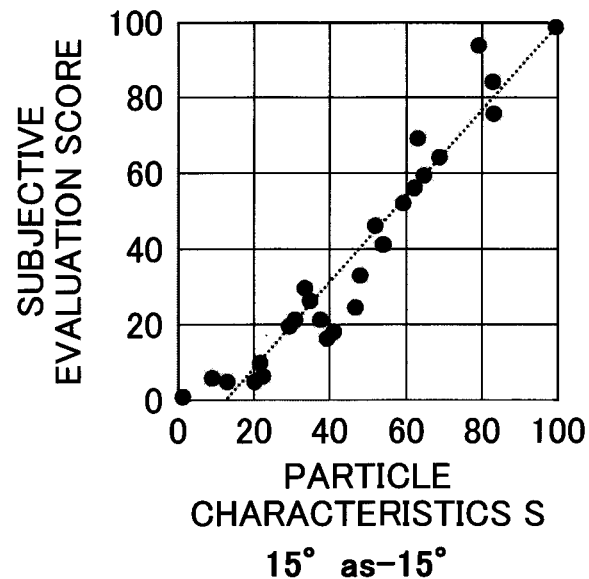
[Fig. 11B]
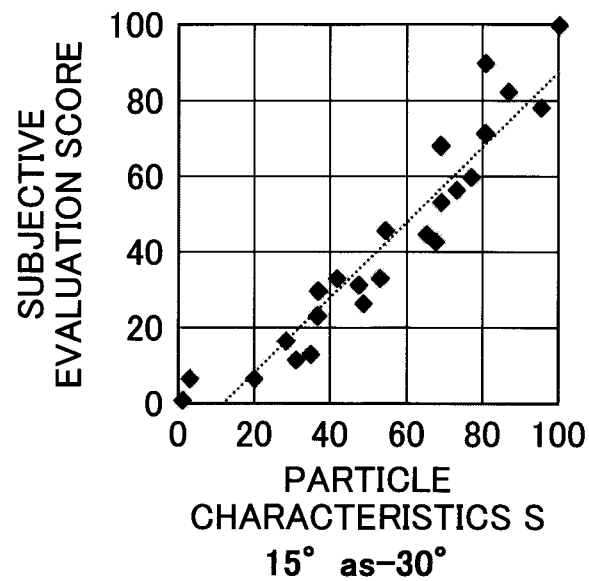

[Fig. 11C]
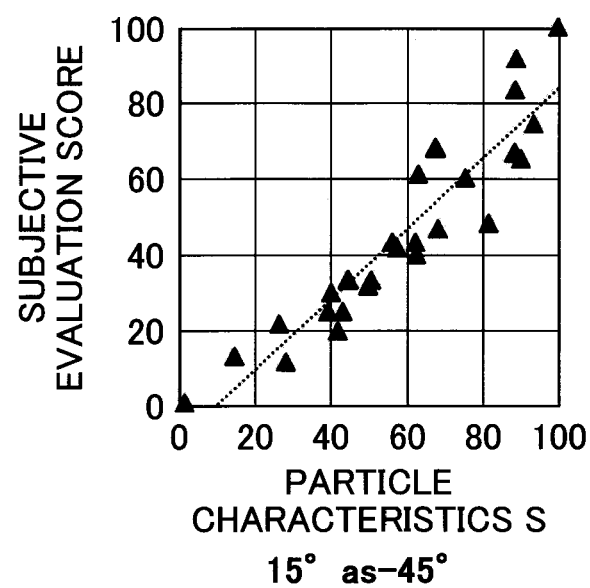

US 12,125,220 B2

SURFACE CHARACTERISTICS EVALUATION METHOD, SURFACE CHARACTERISTICS EVALUATION APPARATUS, AND SURFACE CHARACTERISTICS EVALUATION PROGRAM

CROSS-REFERENCE TO RELATED APPLICATIONS

The present application is based on PCT filing PCT/JP2020/029165, filed Jul. 29, 2020, which claims priority to JP 2019-140260, filed Jul. 30, 2019, the entire contents of each are incorporated herein by reference.

TECHNICAL FIELD

The present invention relates to a surface characteristics evaluation method, a surface characteristics evaluation apparatus, and a surface characteristics evaluation program.

BACKGROUND ART

In recent years, paints mixed with glittering materials such as aluminum flakes and mica flakes have been widely used on the exterior of automobiles and home appliances. By applying such paints to the exteriors of products, a glittering appearance characteristic of the glittering material is visually perceived.

With such paints containing glittering materials, in order to evaluate what is termed as "glittering appearance", there are measurement apparatuses and methods for measuring the painted surface and quantifying this "glittering appearance" as a surface characteristics evaluation value such as particle characteristics (for example, see PTL 1).

SUMMARY OF INVENTION

Technical Problem

However, since the particle characteristics appear differently depending on the observation angle due to factors such as the size and the orientation distribution of the glittering materials contained in the paint, it is has been desired to perform evaluation from various angles. In the conventional technique described in PTL 1, multiple illuminations are used to perform measurement and evaluation with multiple angle conditions, and in order to increase the angle conditions, the number of illuminations or light receivers are required to be increased, which results in problems such as an increase in the cost and an increase in the size of the apparatus.

It is an object of the present invention to enable evaluation of surface characteristics with a relatively larger number of observation angle conditions with a simple configuration.

Solution to Problem

In order to solve the above problem, a surface characteristics evaluation method according to an aspect of the present invention is a surface characteristics evaluation method for evaluating a surface characteristic of a painted surface including a glittering material, and the surface characteristics evaluation method includes: a multi-angle condition image acquisition step for acquiring a multi-angle condition image including multi-angle conditions in a continuous manner by performing an image-capturing process to capture how a reflection condition of the painted surface changes when rotating at least one of an illumination device emitting light onto the painted surface and an image-capturing device capturing images of the painted surface onto which the light is emitted, the image-capturing process being performed by the image-capturing device while a sample having the painted surface is moved in a certain direction; an in-plane chromaticity distribution acquisition step for acquiring an in-plane chromaticity distribution of the painted surface from the multi-angle condition image acquired in the multi-angle condition image acquisition step; and a surface characteristics evaluation step for calculating surface characteristics evaluation values of the multi-angle conditions, on the basis of the in-plane chromaticity distribution acquired in the in-plane chromaticity distribution acquisition step.

Advantageous Effects of Invention

A surface characteristic can be evaluated with a relatively larger number of observation angle conditions with a simple configuration.

BRIEF DESCRIPTION OF DRAWINGS

FIG. 1 illustrates enlarged images of surfaces of 26 types of samples used in the present embodiment.

FIG. 2 is a drawing illustrating a schematic configuration of a surface characteristics evaluation apparatus according to the present embodiment.

FIG. 3 is an explanatory diagram of an angle condition.

FIG. 4A is a drawing illustrating an example of a multi-angle condition image acquired according to the present embodiment.

FIG. 4B is a drawing illustrating an example of a multi-angle condition image acquired according to the present embodiment.

FIG. 4C is a drawing illustrating an example of a multi-angle condition image acquired according to the present embodiment.

FIG. 5 is a functional block diagram of a control device.

FIG. 6 is a hardware configuration diagram of the control device.

FIG. 7 is a flowchart of a surface characteristics evaluation process.

FIG. 8 is a drawing illustrating an example of characteristics of CSF in a case where the observation distance is 400 mm.

FIG. 9 is a drawing illustrating an example of particle characteristics calculated in the present embodiment.

FIG. 10A is a schematic view for explaining a procedure of a subjective evaluation experiment.

FIG. 10B is a schematic view for explaining a condition of the subjective evaluation experiment.

FIG. 11A is a drawing illustrating a correlation between subjective evaluation scores and particle characteristics.

FIG. 11B is a drawing illustrating a correlation between subjective evaluation scores and particle characteristics.

FIG. 11C is a drawing illustrating a correlation between subjective evaluation scores and particle characteristics.

DESCRIPTION OF EMBODIMENTS

Hereinafter, an embodiment will be described with reference to the accompanying drawings. In order to facilitate understanding of the description, similar constituent elements in drawings are denoted with the same reference numerals, and redundant description thereabout is omitted.

<Overview of Samples>

A surface characteristics evaluation apparatus 1 and a surface characteristics evaluation method according to the present embodiment calculate surface characteristics (i.e., particle characteristics S in the present embodiment) of multiple samples P having different characteristics under multi-angle conditions of the respective samples P. First, an overview of the samples P used in the present embodiment will be explained with reference to FIG. 1.

The particle characteristics S are known to change according to the size and the orientation angle of the glittering material included in the paint. Therefore, in the present embodiment, an attention is paid to the size of the glittering material, and 26 flat-plate paint samples having glittering materials in different sizes were prepared. Hereinafter, the samples may be denoted by respective reference symbols P1 to P26, or may be collectively denoted by a reference symbol P.

The sizes of the samples P were about 30×25 mm, and all of the samples P were in a color of metallic silver. FIG. 1 illustrates surfaces of the 26 types of samples P1 to P26 used in the present embodiment. In FIG. 1, each area having a width of 15 mm is shown in an enlarged manner. In FIG. 1, the sample P1 had the largest glittering material size, and the glittering material size decreased as the suffix (numeral) of the reference symbol of the sample increased. The sample P26 had the smallest glittering material size. The diameter of the glittering material was in a range of about 8 μm to about 60 μm. In general, when the glittering material is large, a person is likely to feel a strong impression of glittering or glittering particles, and when the glittering material is small, a person is less likely to feel them.

<Surface Property Evaluation Apparatus>

FIG. 2 is a drawing illustrating the schematic configuration of the surface characteristics evaluation apparatus 1 according to the present embodiment. In FIG. 2, arrangements of elements of the surface characteristics evaluation apparatus 1 are illustrated in a plan view. As illustrated in FIG. 2, the surface characteristics evaluation apparatus 1 includes an illumination device 2, a sample stage 3, a line scan camera 4 (image-capturing device), a rotating stage 5 (rotating device), a linear stage 6 (moving device), and a control device 7.

The illumination device 2 emits light to the painted surface of the sample P. In the present embodiment, a high color-rendering LED is used as an illumination device 2, and the light is made into parallel light by a lens. The brightness near the sample surface is about 14000 lux. The illumination device 2 may be not only the high color-rendering LED but also a halogen lamp, a xenon lamp, and the like.

The sample stage 3 is a table on which the sample P is placed and the sample P can be held in a standing manner so that the painted surface of the sample P faces the illumination device 2 with the light of the illumination device 2 being emitted to the painted surface of the sample P.

The line scan camera 4 captures an image of the painted surface of the sample P onto which the light is emitted. In the present embodiment, the line scan camera 4 is of a spectroscopic type, and the line scan camera 4 can measure a range of 400 to 1000 mm with a 12-bit dynamic range. In the present embodiment, a range of 400 to 700 mm in the above measurement range is used with a resolution of 31 bands. The resolution of the image is set to about 1000 dpi (25 μm/pixel). The line scan camera 4 may be not only the spectroscopic type camera but also an RGB or monochrome camera.

The rotating stage 5 rotates and moves the illumination device 2. The rotating stage 5 has an axis of rotation extending in a standing direction of the sample P (for example, a vertical direction), and the illumination device 2 is fixed to an arm 5A extending from this axis of rotation in a radial direction. The illumination device 2 is installed to face the rotation center of the rotating stage 5 so that its optical axis intersects the axis of rotation. Accordingly, the illumination device 2 is configured to rotate around the axis of rotation according to the rotation of the rotating stage 5 so as to continuously change the illumination angle.

The linear stage 6 moves the sample stage 3 in one direction. The linear stage 6 is installed so that its moving direction overlaps the axis of rotation of the rotating stage 5. Accordingly, the illumination position to the sample P placed on the sample stage 3 is configured to be changed continuously along the moving direction.

The control device 7 controls operation of the illumination device 2, the line scan camera 4, the rotating stage 5, and the linear stage 6. Specifically, the control device 7 causes the line scan camera 4 to capture multi-angle condition images IM of the respective samples P by synchronously controlling the ON and OFF states of the illumination device 2, the image-capturing timing of the line scan camera 4, the start and stop of the rotation of the rotating stage 5, and the start and stop of the movement of the linear stage 6. Also, the control device 7 calculates the particle characteristics S of the painted surface by using the multi-angle condition image IM acquired with the line scan camera 4.

In the present embodiment, as illustrated in FIG. 2, the sample P is attached to the sample stage 3 inclined 15 degrees with reference to the line scan camera 4. In other words, the light receiving angle of the line scan camera 4 is 15 degrees. The illumination device 2 rotates 56 degrees from an initial position that is inclined −60.5 degrees with reference to the specular reflection condition (15 degrees as −60.5 degrees) to a position that is inclined −4.5 degrees with reference to the specular reflection condition (15 degrees as −4.5 degrees).

Hereinafter, the description of the angle condition is explained. FIG. 3 is an explanatory diagram of an angle condition. The angle condition is described as (XX degrees as YY degrees, in which XX degrees denotes a "light receiving angle", and YY degrees denotes a "shift in angle from the angle of incidence for specular reflection"). The "light receiving angle" is an inclination of a light receiver of the line scan camera 4 with reference to the direction normal to the sample P. The "shift in angle from the angle of incidence for specular reflection" is a shift in angle from the angle of incidence (defined as 0 degrees) of incident light emitted by the illumination device 2, at which the specularly-reflected light of the incident light is received by the light receiver of the line scan camera 4. A shift in angle toward the direction normal to the sample is represented as a positive angle, and a shift in angle away from the direction normal to the sample is represented as a negative angle.

In the surface characteristics evaluation apparatus 1, the rotating stage 5 and the linear stage 6 are provided as separate elements separated from each other. Accordingly, the moving direction of the linear stage 6 is maintained in a certain direction without depending on the rotating position of the rotating stage 5. In other words, the moving direction of the linear stage 6 is configured so as not to change according to the rotation of the rotating stage 5. Therefore, while the illumination device 2 is rotated by the rotating stage 5, the sample P can be moved in a certain direction by the linear stage 6.

In the present embodiment, while the illumination device 2 is rotating, and the sample stage 3 is moved by the linear stage 6, the line scan camera 4 performs an image-capturing process to acquire a two-dimensional image of the painted surface of the sample P. In this example, the measured image has 850×560 pixels, and 10 pixels are scanned while the illumination device 2 rotates 1 degree. Here, the 850 pixels in the vertical direction is the number of fixed pixels of the line sensor of the line scan camera 4, and the 560 pixels in the horizontal direction is the total resolution of the scan. In other words, in the present embodiment, the scan is performed at 10 pixels per degree as described above, and a multi-angle condition image IM including 56 angle conditions (i.e., 560 pixels divided by 10 pixels) is acquired from a single two-dimensional image of the painted surface of the sample P.

In the present embodiment, the sample stage 3 is arranged with an inclination of 15 degrees with reference to the line scan camera 4, but may be arranged perpendicular thereto. In the present embodiment, totally 56 angle conditions are measured in a single scan, but the number of angle conditions may be increased or decreased by adjusting the rotating speed of the illumination device 2.

FIGS. 4A to 4C are drawings illustrating examples of multi-angle condition images IM acquired by the present embodiment. The images of FIGS. 4A to 4C were acquired by converting the acquired spectral images into RGB images. FIGS. 4A to 4C illustrate image examples of the samples P1, P13, P26, respectively. In each of the images of FIGS. 4A to 4C, the left end was (15 degrees as −60.5 degrees), and the right end was (15 degrees as −4.5 degrees). In the sample P1 having a glittering material in a large size, strong bright spots of the glittering materials can be observed even in shade conditions as compared to the other two samples. Also, the particle characteristics were high in highlight conditions close to the specular reflection.

<Functional Block of Control Device>

FIG. 5 is a functional block diagram of the control device 7. As illustrated in FIG. 5, with regard to the above functions, the control device 7 includes an illumination device control unit 11, a line scan camera control unit 12, a rotating stage control unit 13, a linear stage control unit 14, a multi-angle condition image acquisition unit 15, an in-plane chromaticity distribution acquisition unit 16, a spatial-frequency characteristics calculation unit 17, a weighting unit 18, an integrated value acquisition unit 19, a correction unit 20, and a surface characteristics evaluation unit 21.

The illumination device control unit 11 controls the operation of the illumination device 2. The line scan camera control unit 12 controls the operation of the line scan camera 4. The rotating stage control unit 13 controls the operation of the rotating stage 5. The linear stage control unit 14 controls the operation of the linear stage 6.

The multi-angle condition image acquisition unit 15 acquires the multi-angle condition image IM as illustrated in FIGS. 4A to 4C. The multi-angle condition image acquisition unit 15 transmits operation instructions to the illumination device control unit 11, the line scan camera control unit 12, the rotating stage control unit 13, and the linear stage control unit 14 to synchronously control the illumination device 2, the line scan camera 4, the rotating stage 5, and the linear stage 6 to acquire the multi-angle condition image IM. While the linear stage 6 moves the sample P in a certain direction, the multi-angle condition image acquisition unit 15 causes the line scan camera 4 to capture images showing how the reflection condition on the painted surface changes when the illumination device 2 emits light to the painted surface of the sample P while the illumination device 2 is rotated by the rotating stage 5.

The in-plane chromaticity distribution acquisition unit 16 acquires the in-plane chromaticity distribution on the painted surface of the sample P from the multi-angle condition image IM.

The spatial-frequency characteristics calculation unit 17 calculates the spatial-frequency characteristics by dividing the multi-angle condition image IM into respective angle conditions on the basis of the amount of change in the in-plane chromaticity distribution.

The weighting unit 18 weights (i.e., assigns weights to), by spatial frequency characteristics of the visual system, the spatial frequency characteristics under the respective angle conditions calculated by the spatial-frequency characteristics calculation unit 17.

For each of the samples P, the integrated value acquisition unit 19 calculates an integrated value acquired by integrating the spatial frequency characteristics weighted by the weighting unit 18.

The correction unit 20 corrects, with the reflection intensity of the glittering material, the integrated value calculated by the integrated value acquisition unit 19.

The surface characteristics evaluation unit 21 uses the integrated value corrected by the correction unit 20 to calculate a surface characteristics evaluation value (particle characteristic) for each of the multi-angle conditions.

The details of the functions of the in-plane chromaticity distribution acquisition unit 16, the spatial-frequency characteristics calculation unit 17, the weighting unit 18, the integrated value acquisition unit 19, the correction unit 20, and the surface characteristics evaluation unit 21 will be described with reference to FIG. 7.

FIG. 6 is a hardware configuration diagram of the control device 7. As illustrated in FIG. 6, the control device 7 can be configured as a computer system physically including a CPU (Central Processing Unit) 101, a RAM (Random Access Memory) 102 which is a main storage apparatus, a ROM (Read Only Memory) 103, an input device 104 such as a keyboard and a mouse, an output device 105 such as a display and a touch panel, a communication module 106 which is a data transmission and reception device such as a network card and the like, and an auxiliary storage device 107 such as a hard disk.

The functions of the control device 7 illustrated in FIG. 5 are implemented by causing hardware such as the CPU 101 and the RAM 102 to read predetermined computer software (surface characteristics evaluation program) to cause the communication module 106, the input device 104, and the output device 105 to operate under the control of the CPU 101, and read and writ data to and from the RAM 102 and the auxiliary storage device 107. In other words, by causing the surface characteristics evaluation program according to the present embodiment to be executed on a computer, the surface characteristics evaluation apparatus 1 functions as the illumination device control unit 11, the line scan camera control unit 12, the rotating stage control unit 13, the linear stage control unit 14, the multi-angle condition image acquisition unit 15, the in-plane chromaticity distribution acquisition unit 16, the spatial-frequency characteristics calculation unit 17, the weighting unit 18, the integrated value acquisition unit 19, the correction unit 20, and the surface characteristics evaluation unit 21 as illustrated in FIG. 5.

The surface characteristics evaluation program according to the present embodiment is stored in, for example, a storage device provided in the computer. A part or the entirety of the surface characteristics evaluation program may be transmitted via a transmission medium such as a communication line, received by a communication module or the like included in the computer, and recorded (and installed) in the computer. In addition, a part or the entirety of the surface characteristics evaluation program may be recorded (and installed) in the computer from a portable storage medium such as CD-ROM, DVD-ROM, flash memory, and the like.

<Surface Property Evaluation Method>

A surface characteristics evaluation method according to the present embodiment will be explained with reference to FIG. 7. FIG. 7 is a flowchart of a surface characteristics evaluation process.

In step S101, the multi-angle condition image acquisition unit 15 acquires a multi-angle condition image IM of the painted surface of the sample P (multi-angle condition image acquisition step). As explained with reference to FIG. 2 to FIG. 5, while the sample P is placed on the sample stage 3, the multi-angle condition image acquisition unit 15 rotates and drives the rotating stage 5 to rotate, from (15 degrees as −60.5 degrees) to (15 degrees as −4.5 degrees), the angle of incidence of light emitted from the illumination device 2 to the painted surface. During the execution of this rotation, the line scan camera 4 captures the images of the sample P while the linear stage 6 is moved in a certain direction by 10 pixels, with respect to the line sensor of the line scan camera 4, per every 1 degree of rotation. As a result, a multi-angle condition image IM including 56 angle conditions, each angle condition including an image of 10 pixels, can be acquired from a single sample P. Hereinafter, the multi-angle condition image IM may also be referred to as a "spectral image".

In step S102, the in-plane chromaticity distribution acquisition unit 16 converts the spectral image IM acquired in step S101 into an L*a*b* image to generate an in-plane chromaticity distribution (in-plane chromaticity distribution acquisition step). Hereinafter, this procedure will be explained.

In order to calculate the L*a*b* image, first, the following expression (1) is used to convert the spectral image IM into an XYZ image.

Math 1

$$X = k \int S(\lambda)x(\lambda)R(\lambda)d\lambda \quad (1)$$
$$Y = k \int S(\lambda)y(\lambda)R(\lambda)d\lambda$$
$$Z = k \int S(\lambda)z(\lambda)R(\lambda)d\lambda$$

Herein, S ($\lambda$) denotes a spectral distribution of the illumination, x ($\lambda$), y ($\lambda$), z ($\lambda$) denote color-matching functions, R ($\lambda$) denotes a spectral reflectance, and k denotes a factor. The factor k can be calculated from the following expression (2). It should be noted that the spectral reflectance R ($\lambda$) normalizes the captured image data of the sample P by using captured image data of a white reference plate having a reflectance of 100% and having a reflection property close to a perfect reflecting diffuser, thereby expresses the captured image data in terms of reflectance.

Math 2

$$k = 100 \bigg/ \int S(\lambda)y(\lambda)d\lambda \quad (2)$$

It should be noted that the spectral reflectance R ($\lambda$) of the above expression (1) may also be expressed as "a multi-angle condition reflectance image acquired by dividing a multi-angle condition image IM, which is acquired by measuring a sample P, by a multi-angle condition image, which is acquired by measuring the white reference plate under the same measurement condition as the sample P".

Subsequently, the following expression (3) is used to convert the XYZ image into an L*a*b* image.

Math 3

$$L* = 116*(Y/Y_n)^{\frac{1}{3}} - 16 \quad (3)$$
$$a* = 500*\left\{(X/X_n)^{\frac{1}{3}} - (Y/Y_n)^{\frac{1}{3}}\right\}$$
$$b* = 200*\left\{(Y/Y_n)^{\frac{1}{3}} - (Z/Z_n)^{\frac{1}{3}}\right\}$$

In the present embodiment, the color-matching function is based on a field of view of 10 degrees. The spectral distribution S ($\lambda$) is a spectral distribution of D65. Xn, Yn, Zn are the tristimulus values on the perfect reflecting diffuser defined by International Commission on Illumination (CIE, Commission Internationale de l'Eclairage). In this case, Xn=96.42, Yn=100, Zn=82.49.

In step S103, the spatial-frequency characteristics calculation unit 17 calculates the spatial-frequency characteristics by using the L* image of the color chromaticity diagrams acquired in step S102 (spatial-frequency characteristics calculation step). Hereinafter, this procedure will be explained.

First, the L* image is divided with a step of one degree, i.e., the L* image is divided into 56 images each having 850×10 pixels. Herein, a geometric condition is defined at a center angle of each of the divided images. For example, the geometric condition of a divided image ranging from −60.5 degrees to −59.5 degrees is expressed as (15 degrees as −60 degrees).

Subsequently, each divided L* image is processed as follows. An L* deviation image is acquired by subtracting an L* image average value from the value of each pixel. Here, the L* image average value is a value L* ave acquired by summing all the L* values of the 850×10 pixels and dividing the summation of the L* values by the image size (850×10 pixels). By using the deviation image, the contrast component of the illuminance can be extracted. In a deviation image generated from a sample having a metal surface, a plating tone, or the like, the deviation values uniformly approach zero.

In a deviation image generated from a shimmering sample, the deviation values may locally increase. Such pixels locally having a higher degree of illuminance are perceived by human eyes as particle characteristics. The acquired L* deviation images in the respective angles are transformed by the two-dimensional Fourier transform. With the Fourier transform, a distribution of the amplitude with respect to the frequency, i.e., spatial-frequency characteristics, is acquired.

In step S104, the weighting unit 18 weights the two-dimensional spatial-frequency characteristics acquired in step S103 by a "contrast sensitivity function (CSF) which relates to spatial-frequency characteristics of the visual system at an observation distance" (weighting step). In the present embodiment, the function shown in the following expression (4) is used as the spatial-frequency characteristics of the visual system. Accordingly, the two-dimensional spatial-frequency characteristics acquired in step S103 can be emphasized or suppressed in accordance with the sensitivity characteristics of a person at any given observation distance. In the present embodiment, the observation distance is assumed to be 400 mm.

Math 4

$$CSF = 5.05 * \exp(-0.138\nu)\{1 - \exp(-0.1\nu)\} \quad (4)$$

Here, the unit of $\nu$ is cycles/degree. $\nu$ is an index indicating how many cycles of a wave are present in a field of view of one degree. In a case of a relatively high frequency, the index $\nu$ is a relatively large value. In a case of a relatively low frequency, the index $\nu$ is a relatively small value. FIG. 8 is a drawing illustrating an example of characteristics of the CSF in a case where the observation distance is 400 mm. The horizontal axis of FIG. 8 represents the frequency, and the vertical axis represents the sensitivity. In FIG. 8, the unit of frequency is converted from cycles/degree to cycles/mm. Since the expression (4) is a one-dimensional expression, the two-dimensional spatial-frequency characteristics are weighted after the expression (4) is expressed in two dimension by rotation about a zero frequency axis.

In the present embodiment, "the spatial-frequency characteristics of the visual system" in the left-hand side of the above expression (4) is abbreviated as "CSF", but may also be denoted as "VTF". Also, a function for known visual sense characteristics other than the above expression (4) may be used as "the spatial-frequency characteristics of the visual system". The observation distance may change.

In step S105, the integrated value acquisition unit 19 integrates the weighted two-dimensional spatial-frequency characteristics acquired in step S104 to calculate an integrated value $G_L^*$ (integrated value acquisition step). With increase in what is termed as "shimmering" of the sample, the integrated value $G_L^*$ becomes a larger value. In the present embodiment, the integrated value $G_L^*$ has been calculated using the entire frequency band, but in a case where attention is paid to particle characteristics in a particular frequency band, the integrated value $G_L^*$ may be derived by integrating the weighted two-dimensional spatial-frequency characteristics only with respect to the frequency band in question.

In step S106, the correction unit 20 performs correction using the glittering material reflection intensity (correction step). This correction is performed in view of some of the glittering materials that have particularly high reflection intensities. Specifically, it was found through the research conducted by the inventors of the present application that a person may be greatly affected by some of the glittering materials that have particularly high reflection intensities in the sample P, and may perceive a high level of particle characteristics. Specifically, the correction is preferably performed such that the integrated value $G_L^*$ becomes higher in accordance with an increase in the reflection intensity of the glittering material in the in-plane chromaticity distribution. In the present embodiment, a correction value H is a value acquired by averaging pixels having the top 10 highest L* values in the L* image having 850×10 pixels under each of the angle conditions calculated in step S102. It should be noted that the number of pixels retrieved as the correction value may be changed in accordance with the measurement size.

Lastly, in step S107, the surface characteristics evaluation unit 21 calculates the particle characteristics S by using the following expression (5) (surface characteristics evaluation step).

Math 5

$$S = \log(G_{L^*} \cdot H) \quad (5)$$

The above equation (5) is expressed as a logarithm according to Weber-Fechner's law stating that the subjective sensation is proportional to the logarithm of the stimulus intensity. FIG. 9 is a drawing illustrating an example of particle characteristics S calculated in the present embodiment. In FIG. 9, the horizontal axis represents an angle condition of the illumination device 2, and the vertical axis represents the particle characteristics S. FIG. 9 illustrates characteristics graphs of the samples P1, P5, P10, P15, P20, P25. It can be understood from FIG. 9 that the value of the particle characteristic S of the sample P1 was particularly high, and the value changed greatly from the highlight to the shade.

<Subjective Evaluation Experiment>

In order to evaluate the adequacy of the particle characteristics S of the painted surface calculated according to the present embodiment, a subjective evaluation experiment was conducted. Hereinafter, the subjective evaluation experiment will be explained.

FIGS. 10A and 10B are schematic diagram for explaining an overview of the subjective evaluation experiment. The subjective evaluation experiment was conducted as shown in the procedure of the experiment illustrated in FIGS. 10A and 10B. In the experiment, the particle characteristic of the sample P1 was defined as a score of "100", and the particle characteristic of the sample P26 was defined as a score of "1". Then, three evaluators evaluated the particle characteristics of the remaining 24 samples, i.e., the samples P2 to P25.

As illustrated in the experiment condition of FIG. 10, the sample P was placed on a sheet of black matte paper, and artificial sunlight was emitted from an angle inclined 15 degrees with reference to the direction normal to the sample P. The illuminance in proximity to the surface of the sample P was about 8000 lux. The evaluator observed the sample P from angles inclined 15 degrees, 30 degrees, and 45 degrees with reference to the specular reflection direction of the artificial sunlight. The observation distance was 400 mm. Under each condition, an average of scores given by the three evaluators was adopted as a subjective evaluation score.

FIGS. 11A to 11C are drawings illustrating correlations between subjective evaluation scores and the particle characteristics S. Specifically, FIGS. 11A to 11C illustrate correlations between subjective evaluation scores of the three observation conditions, i.e., (15 degrees as −15 degrees), (15 degrees as −30 degrees), and (15 degrees as −45 degrees), and the particle characteristics S corresponding to the angles of the respective observation conditions. The particle characteristics S of the respective angles were calculated by the expression (5). Further, the values of the particle characteristics S of the samples P1 to P26 calculated by the expression (5) were converted into a range of 1 to 100 corresponding to a range of scores "1" to "100" of the subjective evaluation scores.

The method of conversion of the particle characteristics S is, for example, as described below.

(1) In original data, a difference between a maximum value and a minimum value is derived.
(2) The difference is divided by 99 to derive an interval between adjacent points. The interval is a converted difference per point in the original data.
(3) For the maximum value of the original data, a converted value of "100" is defined. For the minimum value of the original data, a converted value of "1" is defined. Then, for each of the values of the remaining samples, a converted value is derived in accordance with a difference from the maximum value or the minimum value.

As illustrated in FIGS. 11A to 11C, in any of the three observation conditions, there is a high degree of correlation between the subjective evaluation scores and the particle characteristics S. The contribution rates in the graphs are 0.92, 0.90, 0.87, which are extremely high. Accordingly, it has been confirmed that the particle characteristics S of the painted surface calculated by the present embodiment are adequate.

As explained above, according to the present embodiment, the multi-angle condition image IM including multi-angle conditions in a continuous manner is used as an image for evaluation of the surface characteristics of the painted surface of the sample P. This multi-angle condition image IM is acquired as a single image by executing, in the multi-angle condition image acquisition step S101, a series of operations in which the line scan camera 4 captures, while the sample P having the painted surface is moved in a certain direction, images showing how the reflection condition of the painted surface changes when the illumination device 2 emitting light onto the painted surface is rotated. Therefore, it is not necessary to perform a post-processing after the image-capturing process, such as, for example, a process for combining multiple images captured under multiple measurement conditions for acquiring the multi-angle condition image IM, and the multi-angle condition image IM can be acquired easily. Therefore, when the surface characteristics are evaluated by using this multi-angle condition image, the surface characteristics can be evaluated under many observation angle conditions with a simple configuration.

In particular, in the case of the present embodiment, since the particle characteristics S are calculated as surface characteristics evaluation values, an image having a certain width (for example, 10 pixels) is to be prepared as an image of each angle condition. For this reason, the particle characteristics S cannot be calculated by acquiring data of images at the same position of the sample P captured from different angle conditions while the sample P is fixed, but the particle characteristics S can be calculated by acquiring data of images captured while the sample P or the camera is moved in a certain direction. Therefore, the acquisition method for acquiring the multi-angle condition image IM according to the present embodiment has many features common to conventional acquisition methods of images for calculating the particle characteristics S, and can evaluate the surface characteristics with a much simpler configuration, and is particularly effective in a case where the particle characteristics S are used as the surface characteristics evaluation values.

Further, in the present embodiment, in the weighting step S104, the CSF (the spatial-frequency characteristics of the visual system) is changed according to the observation distance of the painted surface of the sample P, and each of the spatial-frequency characteristics calculated in the spatial-frequency characteristics calculation step S103 is weighted by the CSF (the spatial-frequency characteristics of the visual system). Accordingly, the particle characteristics S serving as the surface characteristics evaluation values can be calculated in accordance with the assumed observation distance, and the particle characteristics S can be calculated more accurately.

Further, in the present embodiment, in the multi-angle condition image acquisition step S101, image-capturing is performed by adjusting the scan speed of the line scan camera 4 in accordance with the moving speed of the sample P. Accordingly, in the acquired multi-angle condition image IM, the vertical and horizontal measurement ranges per pixel can be configured to be the same as each other, and variation in the accuracies of the particle characteristics S can be reduced by uniformizing the image-capturing range of the respective angle conditions.

Further, in the present embodiment, in the multi-angle condition image acquisition step S101, the rotating speed of the illumination device 2 can be adjusted to any given speed. As a result, in the acquired multi-angle condition image IM, the number of angle conditions that can be acquired can be adjusted.

Further, in the present embodiment, the in-plane chromaticity distribution acquired in the in-plane chromaticity distribution acquisition step S102 includes the amounts of changes in $L^*$, $a^*$, $b^*$ in the $L^*a^*b^*$ color space. Therefore, since the spectral image IM is converted into a color space that matches human perception, the correlation with visual evaluation is improved.

Further, in the present embodiment, in the in-plane chromaticity distribution acquisition step S102, the in-plane chromaticity distribution is acquired by converting the multi-angle condition image IM into the $L^*a^*b^*$ color space. The multi-angle condition reflectance image acquired by dividing the multi-angle condition image IM, which is acquired by measuring the sample P, by the multi-angle condition image, which is acquired by measuring the white reference plate under the same measurement condition as the sample P, is used for this conversion into the $L^*a^*b^*$ color space. In other words, as shown in the above expression (1), the multi-angle condition image IM is converted using the spectral reflectance R ($\lambda$). Accordingly, the use of the multi-angle condition reflectance image serves as a calibration, which enables stable color conversion.

Further, in the present embodiment, before the sample P or the white reference plate are measured, dark current correction is performed. Therefore, camera-specific noise can be reduced. In particular, this is especially effective for a low brightness sample measurement.

The present embodiment has been described above with reference to the above concrete examples. However, the present disclosure is not limited to these concrete examples. The scope of the present disclosure also includes embodiments which a person skilled in the art makes by applying appropriate design changes to the above concrete examples as long as these embodiments include the features of the present disclosure. The constituent elements, the arrangements, the condition, the shape, and the like of the constituent elements provided in the concrete examples described above are not limited to those illustrated, and can be changed as appropriate. The respective elements included in the concrete examples described above can be appropriately combined as long as a technical contradiction does not occur.

In the above embodiment, a configuration for calculating the particle characteristics S as evaluation values indicating the surface characteristics of the painted surface has been explained. However, it is also possible to, for example, calculate other surface characteristics evaluation values such as changes in brightness and color.

In the above embodiment, when the multi-angle condition image IM is acquired, for example, the illumination device 2 is rotated, and the line scan camera 4 is fixed. However, other configurations may also be employed as long as the line scan camera 4 can capture images of the painted surfaces under the multi-angle conditions changing in a continuous manner. For example, in contrast to the above embodiment, the illumination device 2 may be fixed, and the line scan camera 4 may be rotated.

In the above embodiment, the line scan camera 4 has been shown as an example of an image-capturing device for capturing images of the painted surface of the sample P. However, for example, a configuration using other types of image-capturing devices such as an area camera having a scan mechanism in the camera may be employed.

REFERENCE SIGNS LIST 1 surface characteristics evaluation apparatus
2 illumination device
3 sample stage
4 line scan camera (image-capturing device)
5 rotating stage (rotating device)
6 linear stage (moving device)
7 control device
15 multi-angle condition image acquisition unit
16 in-plane chromaticity distribution acquisition unit
17 spatial-frequency characteristics calculation unit
18 weighting unit
19 integrated value acquisition unit
20 correction unit
21 surface characteristics evaluation unit
P sample
IM multi-angle condition image

CITATION LIST

Patent Literature

[PTL 1] Japanese Patent Publication No. 5475057

The present application is based on and claims the benefit of priority of Japanese Priority Application No. 2019-140260 filed on Jul. 30, 2019, the entire content of which is incorporated herein by reference.

The invention claimed is:

1. A surface characteristics evaluation method for evaluating a surface characteristic of a painted surface including a glittering material, comprising:
   a multi-angle condition image acquisition step of acquiring a multi-angle condition image including multi-angle conditions in a continuous manner by performing an image-capturing process to capture how a reflection condition of the painted surface changes when rotating at least one of a light source emitting light onto the painted surface and an image capturer capturing images of the painted surface onto which the light is emitted, the image-capturing process being performed by the image capturer while a sample having the painted surface is moved in a certain direction;
   an in-plane chromaticity distribution acquisition step of acquiring an in-plane chromaticity distribution of the painted surface from the multi-angle condition image acquired in the multi-angle condition image acquisition step;
   a surface characteristics evaluation step of calculating surface characteristics evaluation values of the multi-angle conditions, on the basis of the in-plane chromaticity distribution acquired in the in-plane chromaticity distribution acquisition step;
   a spatial-frequency characteristics calculation step of calculating spatial-frequency characteristics upon dividing the multi-angle condition image according to the respective multi-angle conditions, on the basis of an amount of change in the in-plane chromaticity distribution acquired in the in-plane chromaticity distribution acquisition step; and
   an integrated value acquisition step of calculating an integrated value by integrating the spatial-frequency characteristics,
   wherein in the surface characteristics evaluation step, the surface characteristics evaluation values are calculated on the basis of the integrated value calculated in the integrated value acquisition step, and
   wherein the method further comprises:
   a correction step of correcting, with a reflection intensity of the glittering material, the integrated value calculated in the integrated value acquisition step,
   wherein in the surface characteristics evaluation step, the surface characteristics evaluation values are calculated by using the integrated value corrected in the correction step.

2. The surface characteristics evaluation method according to claim 1, wherein:
   in the spatial-frequency characteristics calculation step, a number of images into which the multi-angle condition image is divided is changed in accordance with the multi-angle conditions of the multi-angle condition image acquired in the multi-angle condition image acquisition step.

3. The surface characteristics evaluation method according to claim 1, further comprising:
   a weighting step of weighting, by spatial-frequency characteristics of visual system, the spatial-frequency characteristics calculated in the spatial-frequency characteristics calculation step,
   wherein in the integrated value acquisition step, the integrated value is calculated by integrating the spatial-frequency characteristics weighted in the weighting step.

4. The surface characteristics evaluation method according to claim 3, wherein:
   in the weighting step, the spatial-frequency characteristics of the visual system are changed in accordance with an observation distance of the painted surface, and the spatial-frequency characteristics calculated in the spatial-frequency characteristics calculation step are weighted by the spatial-frequency characteristics of the visual system thus changed.

5. The surface characteristics evaluation method according to claim 1, wherein;
the image capturer is a line scan camera, and
in the multi-angle condition image acquisition step, the image-capturing process is performed by adjusting a scan speed of the line scan camera in accordance with a moving speed of the sample.

6. The surface characteristics evaluation method according to claim 1, wherein:
in the multi-angle condition image acquisition step, a rotating speed of the light source or the image capturer can be adjusted to any given rotating speed.

7. The surface characteristics evaluation method according to claim 1, wherein;
the in-plane chromaticity distribution includes amounts of changes in $L^*$, $a^*$, $b^*$ of an $L^*a^*b^*$ color space.

8. The surface characteristics evaluation method according to claim 1, wherein:
in the in-plane chromaticity distribution acquisition step, the in-plane chromaticity distribution is acquired by converting the multi-angle condition image into an $L^*a^*b^*$ color space, and
the multi-angle condition image is converted into the $L^*a^*b^*$ color space by using a multi-angle condition reflectance image acquired by dividing the multi-angle condition image, acquired by measuring the sample, by a reference multi-angle condition image acquired by measuring a white reference plate under a same measurement condition as the sample.

9. The surface characteristics evaluation method according to claim 8, wherein:
a dark current correction is performed before the sample or the white reference plate is measured.

10. The surface characteristics evaluation method according to claim 1, wherein;
the image capturer is a line scan camera.

11. A surface characteristics evaluation apparatus for evaluating a surface characteristic of a painted surface including a glittering material, comprising:
a light source to emit light onto the painted surface; an image capturer configured to capture an image of the painted surface onto which the light is emitted;
a mover configured to move a sample having the painted surface in a certain direction;
a rotator configured to rotate at least one of the light source and the image capturer;
multi-angle condition image acquisition circuitry configured to acquire a multi-angle condition image including multi-angle conditions in a continuous manner by performing an image-capturing process to capture how a reflection condition of the painted surface changes when the light source emits the light onto the painted surface and the rotating device rotates at least one of the light source and the image capturer, the image-capturing process being performed by the image capturer while the sample is moved in a certain direction;
in-plane chromaticity distribution acquisition circuitry configured to acquire an in-plane chromaticity distribution of the painted surface from the multi-angle condition image acquired by the multi-angle condition image acquisition circuitry; and
surface characteristics evaluation circuitry configured to calculate surface characteristics evaluation values of the multi-angle conditions, on the basis of the in-plane chromaticity distribution acquired by the in-plane chromaticity distribution acquisition circuitry;
spatial-frequency characteristics calculation circuitry configured to calculate spatial-frequency characteristics upon dividing the multi-angle condition image according to the respective multi-angle conditions, on the basis of an amount of change in the in-plane chromaticity distribution acquired by the in-plane chromaticity distribution acquisition circuitry; and
integrated value acquisition circuitry configured to calculate an integrated value by integrating the spatial-frequency characteristics,
wherein the surface characteristics evaluation circuitry calculates the surface characteristics evaluation values on the basis of the integrated value calculated by the integrated value acquisition circuitry, and
wherein the surface characteristics evaluation apparatus further comprises:
correction circuitry configured to correct, with a reflection intensity of the glittering material, the integrated value calculated by the integrated value acquisition circuitry,
wherein the surface characteristics evaluation circuitry calculates the surface characteristics evaluation values using the integrated value corrected by the correction circuitry.

12. A non-transitory computer readable medium including a surface characteristics evaluation program for evaluating a surface characteristic of a painted surface including a glittering material, the surface characteristics evaluation program causing a computer to execute:
a multi-angle condition image acquisition function for acquiring a multi-angle condition image including multi-angle conditions in a continuous manner by performing an image-capturing process to capture how a reflection condition of the painted surface changes when rotating at least one of a light source emitting light onto the painted surface and an image capturer capturing images of the painted surface onto which the light is emitted, the image-capturing process being performed by the image capturer while a sample having the painted surface is moved in a certain direction;
an in-plane chromaticity distribution acquisition function for acquiring an in-plane chromaticity distribution of the painted surface from the multi-angle condition image acquired by the multi-angle condition image acquisition function; and
a surface characteristics evaluation function for calculating surface characteristics evaluation values of the multi-angle conditions, on the basis of the in-plane chromaticity distribution acquired by the in-plane chromaticity distribution acquisition function;
a spatial-frequency characteristics calculation function of calculating spatial-frequency characteristics upon dividing the multi-angle condition image according to the respective multi-angle conditions, on the basis of an amount of change in the in-plane chromaticity distribution acquired in the in-plane chromaticity distribution acquisition function; and
an integrated value acquisition function of calculating an integrated value by integrating the spatial-frequency characteristics,
wherein in the surface characteristics evaluation function, the surface characteristics evaluation values are calculated on the basis of the integrated value calculated in the integrated value acquisition function, and wherein the program further causes the computer to execute:
a correction function of correcting, with a reflection intensity of the glittering material, the integrated value calculated in the integrated value acquisition function,
wherein in the surface characteristics evaluation function, the surface characteristics evaluation values are calculated by using the integrated value corrected in the correction function.

13. The surface characteristics evaluation apparatus according to claim 11, wherein:
in the spatial-frequency characteristics calculation circuitry, a number of images into which the multi-angle condition image is divided is changed in accordance with the multi-angle conditions of the multi-angle condition image acquired in the multi-angle condition image acquisition step.

14. The surface characteristics evaluation apparatus according to claim 11, further comprising:
weighting circuitry configured to weight, by spatial-frequency characteristics of visual system, the spatial-frequency characteristics calculated by the spatial-frequency characteristics calculation circuitry,
wherein the integrated value acquisition circuitry calculates the integrated value by integrating the spatial-frequency characteristics weighted by the weighting circuitry.

15. The surface characteristics evaluation apparatus according to claim 14, wherein:
the weighting circuitry changes the spatial-frequency characteristics of the visual system in accordance with an observation distance of the painted surface, and the spatial-frequency characteristics calculated by the spatial-frequency characteristics calculation circuitry are weighted by the spatial-frequency characteristics of the visual system thus changed.

16. The surface characteristics evaluation apparatus according to claim 11, wherein:
the image capturer is a line scan camera, and
the multi-angle condition image acquisition circuitry performs the image-capturing process by adjusting a scan speed of the line scan camera in accordance with a moving speed of the sample.

17. The surface characteristics evaluation apparatus according to claim 11, wherein:
the multi-angle condition image acquisition circuitry adjusts a rotating speed of the light source or the image capturer to any given rotating speed.

18. The surface characteristics evaluation apparatus according to claim 11, wherein:
the in-plane chromaticity distribution includes amounts of changes in $L^*$, $a^*$, $b^*$ of an $L^*a^*b^*$ color space.

19. The surface characteristics evaluation apparatus according to claim 11, wherein:
the in-plane chromaticity distribution acquisition circuitry acquires the in-plane chromaticity distribution by converting the multi-angle condition image into an $L^*a^*b^*$ color space, and
the multi-angle condition image is converted into the $L^*a^*b^*$ color space by using a multi-angle condition reflectance image acquired by dividing the multi-angle condition image, acquired by measuring the sample, by a reference multi-angle condition image acquired by measuring a white reference plate under a same measurement condition as the sample.

20. The surface characteristics evaluation apparatus according to claim 19, wherein:
a dark current correction is performed before the sample or the white reference plate is measured.

* * * * *